United States Patent
Jain et al.

(10) Patent No.: US 12,116,903 B2
(45) Date of Patent: Oct. 15, 2024

(54) COMPOSITE AIRFOILS WITH FRANGIBLE TIPS

(71) Applicant: General Electric Company, Schenectady, NY (US)

(72) Inventors: Nitesh Jain, Bangalore (IN); Nicholas Joseph Kray, Mason, OH (US); Daniel Edward Mollmann, Cincinnati, OH (US); David William Crall, Loveland, OH (US)

(73) Assignee: General Electric Company, Evendale, OH (US)

( * ) Notice: Subject to any disclaimer, the term of this patent is extended or adjusted under 35 U.S.C. 154(b) by 176 days.

(21) Appl. No.: 17/363,102

(22) Filed: Jun. 30, 2021

(65) Prior Publication Data

US 2023/0003129 A1  Jan. 5, 2023

(51) Int. Cl.
| | | |
|---|---|---|
| *F01D 5/14* | (2006.01) | |
| *F01D 5/28* | (2006.01) | |
| *F01D 21/04* | (2006.01) | |

(52) U.S. Cl.
CPC .............. *F01D 5/147* (2013.01); *F01D 5/282* (2013.01); *F01D 5/284* (2013.01); *F01D 21/045* (2013.01); *F05D 2220/36* (2013.01); *F05D 2240/304* (2013.01); *F05D 2240/307* (2013.01); *F05D 2300/6033* (2013.01)

(58) Field of Classification Search
CPC ......... F01D 5/137; F01D 5/282; F04D 29/388
See application file for complete search history.

(56) References Cited

U.S. PATENT DOCUMENTS

| | | | |
|---|---|---|---|
| 3,756,746 A | * | 9/1973 | Baker .................... F01D 5/282 |
| | | | 416/241 A |
| 4,022,540 A | | 5/1977 | Young |
| 4,111,600 A | | 9/1978 | Rothman et al. |
| 4,241,110 A | | 12/1980 | Ueda et al. |
| 4,971,641 A | | 11/1990 | Nelson et al. |
| 5,112,194 A | | 5/1992 | More |

(Continued)

FOREIGN PATENT DOCUMENTS

| | | |
|---|---|---|
| CN | 103628923 B | 3/2016 |
| CN | 213206097 U | 5/2021 |

(Continued)

*Primary Examiner* — J. Todd Newton
*Assistant Examiner* — Cameron A Corday
(74) *Attorney, Agent, or Firm* — Dority & Manning, P.A.

(57) ABSTRACT

Composite airfoils and methods for forming composite airfoils are provided. For example, a composite airfoil of a gas turbine engine comprises opposite pressure and suction sides extending radially along a span from a root to a tip, which define opposite radial extremities of the airfoil. The composite airfoil further comprises a body section and a tip section, which includes the tip, that each extend radially along the span. The composite airfoil is formed from a composite material comprising fibers disposed in a matrix material. The tip section has a tip fiber volume, and the body section has a body fiber volume that is greater than the tip fiber volume. Another composite airfoil comprises a tip cap applied over the tip that tapers from a first end to a second end such that each of the pressure and suction side walls of the tip cap narrows from a first thickness to a second thickness.

18 Claims, 7 Drawing Sheets

(56) References Cited

U.S. PATENT DOCUMENTS

| | | |
|---|---|---|
| 5,123,813 A | 6/1992 | Przytulski et al. |
| 5,129,787 A | 7/1992 | Violette et al. |
| 5,141,400 A | 8/1992 | Murphy et al. |
| 5,222,297 A | 6/1993 | Graff et al. |
| 5,269,658 A | 12/1993 | Carlson et al. |
| 5,392,514 A | 2/1995 | Cook et al. |
| 5,449,273 A | 9/1995 | Hertel et al. |
| 5,486,096 A | 1/1996 | Hertel et al. |
| 5,520,532 A | 5/1996 | Reinfelder et al. |
| 5,580,217 A | 12/1996 | Richards et al. |
| 5,735,673 A | 4/1998 | Matheny et al. |
| 5,836,744 A | 11/1998 | Zipps et al. |
| 5,843,354 A | 12/1998 | Evans et al. |
| 5,844,669 A | 12/1998 | Wang et al. |
| 5,908,285 A | 6/1999 | Graff |
| 5,935,360 A | 8/1999 | Griggs |
| 5,939,006 A | 8/1999 | Wang et al. |
| 6,290,895 B1 | 9/2001 | Wang et al. |
| 6,294,113 B1 | 9/2001 | Woodmansee et al. |
| 6,843,565 B2 | 1/2005 | Evans et al. |
| 7,114,912 B2 | 10/2006 | Gerez et al. |
| 7,736,130 B2 | 6/2010 | Schilling et al. |
| 7,837,446 B2 | 11/2010 | McMillan |
| 8,038,408 B2 | 10/2011 | McMillan |
| 8,100,662 B2 | 1/2012 | Schreiber |
| 8,109,734 B2 | 2/2012 | Backhouse |
| 8,146,250 B2 | 4/2012 | Moroso |
| 8,251,640 B2 | 8/2012 | Beckford et al. |
| 8,573,936 B2 | 11/2013 | Lafont |
| 8,777,577 B2 | 7/2014 | Schreiber |
| 9,976,429 B2 | 5/2018 | Kray et al. |
| 10,094,224 B2 | 10/2018 | Murooka |
| 10,138,738 B2 | 11/2018 | Obuchi et al. |
| 10,427,983 B2 | 10/2019 | Podgorski et al. |
| 10,450,870 B2 | 10/2019 | Nandula et al. |
| 10,746,045 B2 | 8/2020 | Kray et al. |
| 10,837,286 B2 | 11/2020 | Jain et al. |
| 2007/0202296 A1 | 8/2007 | Chandrasekaran et al. |
| 2008/0273983 A1 | 11/2008 | Clark et al. |
| 2009/0035131 A1 | 2/2009 | McMillan |
| 2009/0269203 A1 | 10/2009 | Care et al. |
| 2010/0054937 A1 | 3/2010 | Beckford et al. |
| 2010/0150707 A1 | 6/2010 | Jevons |
| 2010/0296942 A1 | 11/2010 | Jevons |
| 2011/0023301 A1 | 2/2011 | Jones |
| 2011/0027096 A1 | 2/2011 | Northfield |
| 2011/0049297 A1 | 3/2011 | Jevons et al. |
| 2011/0052405 A1 | 3/2011 | Parkin |
| 2011/0129351 A1 | 6/2011 | Das et al. |
| 2011/0182743 A1 | 7/2011 | Naik |
| 2011/0194941 A1 | 8/2011 | Parkin et al. |
| 2011/0217160 A1 | 9/2011 | McMillan |
| 2011/0223027 A1 | 9/2011 | Klinetob et al. |
| 2012/0003100 A1 | 1/2012 | James et al. |
| 2012/0021243 A1 | 1/2012 | Kray et al. |
| 2012/0028055 A1 | 2/2012 | Schmidt |
| 2012/0034089 A1 | 2/2012 | Wadewitz et al. |
| 2012/0051935 A1 | 3/2012 | Naik et al. |
| 2012/0082556 A1 | 4/2012 | Macchia et al. |
| 2012/0100006 A1 | 4/2012 | Merriman et al. |
| 2015/0218953 A1 | 8/2015 | Bottome |
| 2017/0058861 A1 | 3/2017 | Tobin et al. |
| 2017/0370376 A1* | 12/2017 | Kray ................. F01D 5/288 |
| 2018/0002238 A1* | 1/2018 | Hockemeyer ..... C04B 35/62884 |
| 2018/0171802 A1 | 6/2018 | Lacy et al. |
| 2018/0283180 A1 | 10/2018 | Jain et al. |
| 2018/0320706 A1 | 11/2018 | Jain et al. |
| 2019/0242260 A1* | 8/2019 | Kray ................. B23P 15/04 |
| 2019/0242399 A1* | 8/2019 | Kray ................. F01D 21/045 |
| 2020/0116043 A1* | 4/2020 | Jain ................. F01D 21/045 |
| 2020/0141268 A1* | 5/2020 | Kray ................. F01D 5/282 |
| 2020/0200018 A1 | 6/2020 | Ganiger et al. |

FOREIGN PATENT DOCUMENTS

| | | |
|---|---|---|
| EP | 0526057 A1 | 2/1993 |
| EP | 1752610 A2 | 2/2007 |
| EP | 2159378 A2 | 3/2010 |
| EP | 1920895 B1 | 10/2010 |
| EP | 2236235 A1 | 10/2010 |
| EP | 2458153 A2 | 5/2012 |
| FR | 2953225 A1 | 6/2011 |
| GB | 2450139 A | 12/2008 |
| WO | WO2008122751 A2 | 10/2008 |
| WO | WO2010014342 A1 | 2/2010 |

* cited by examiner

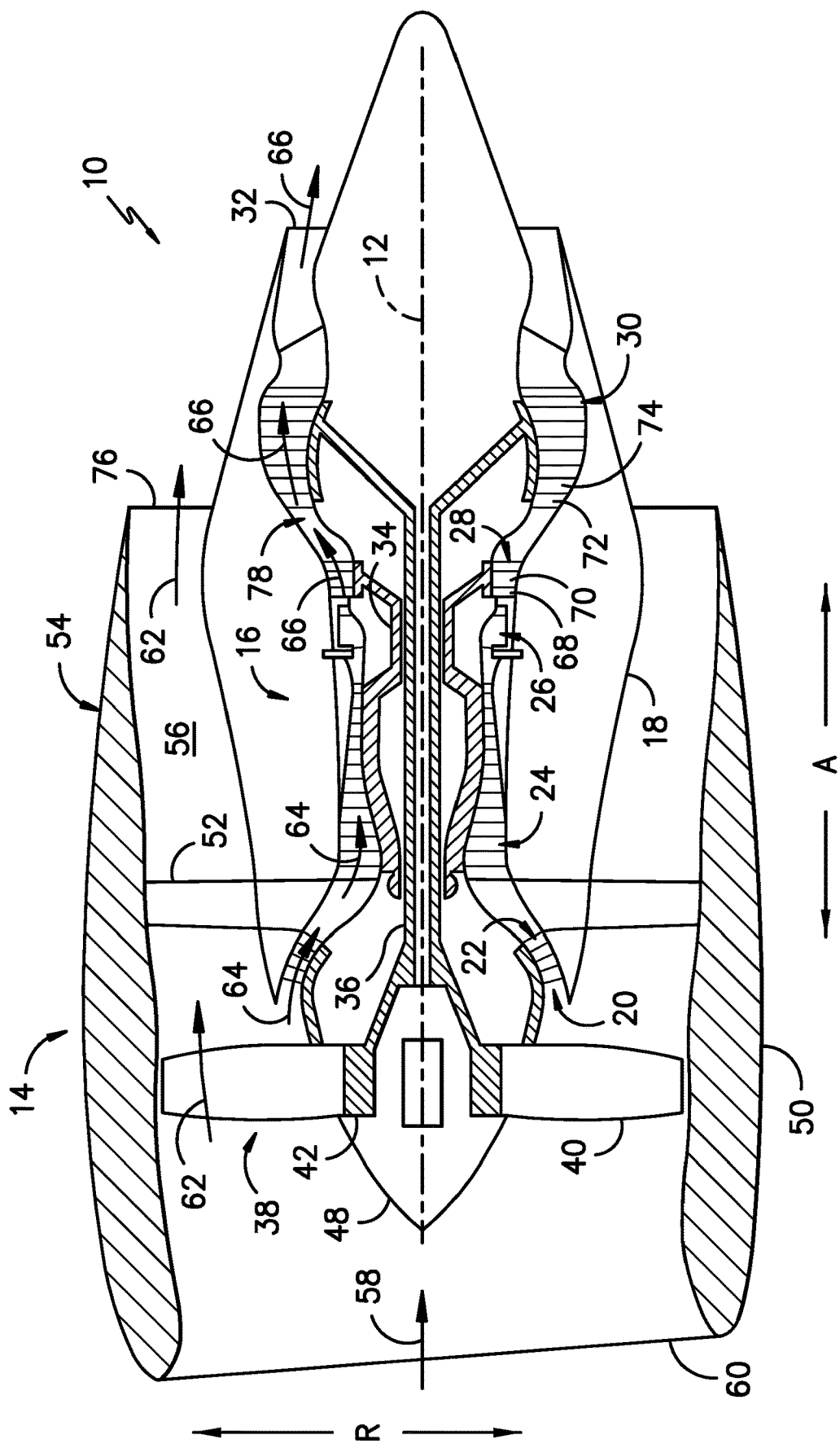
FIG. -1-

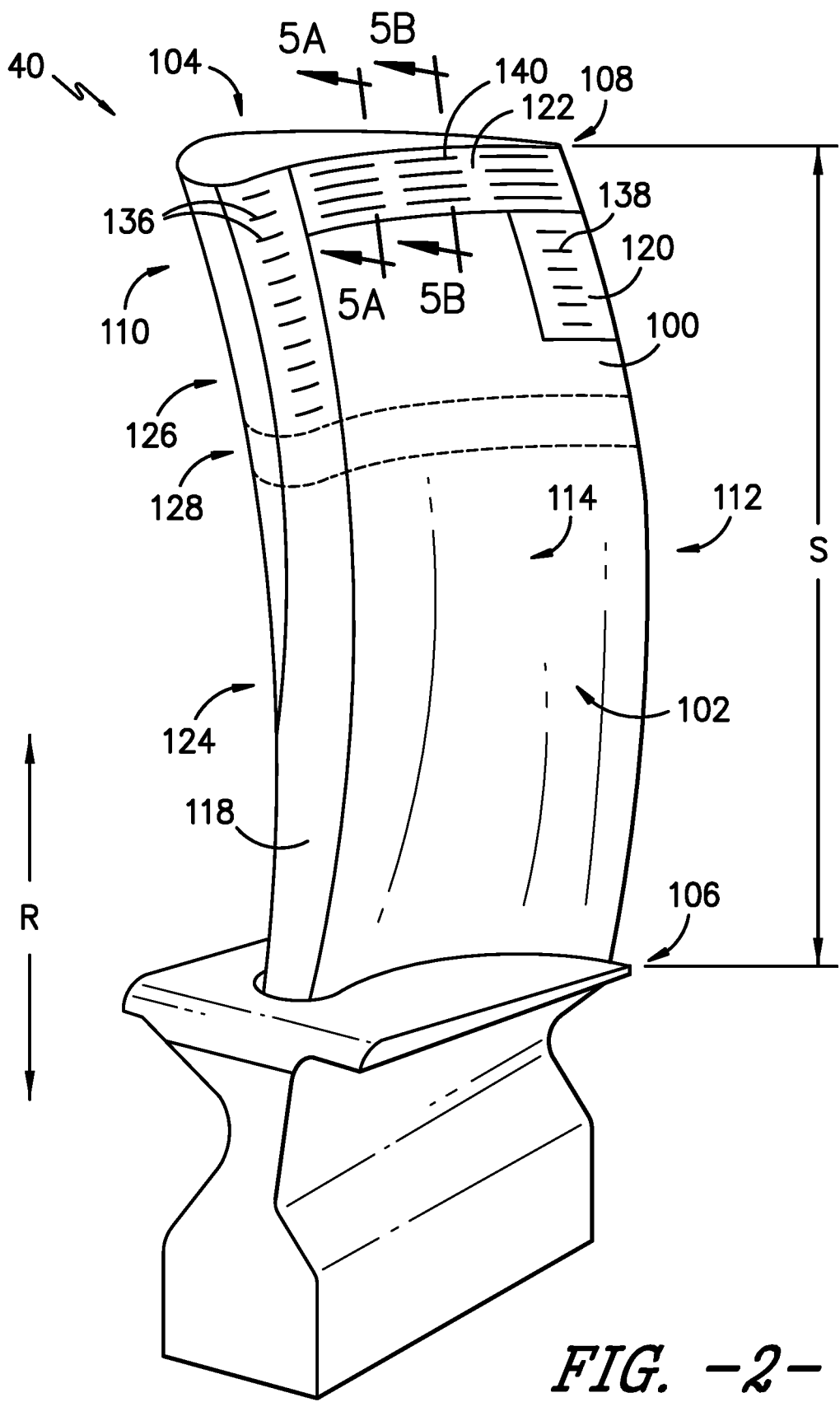
FIG. -2-

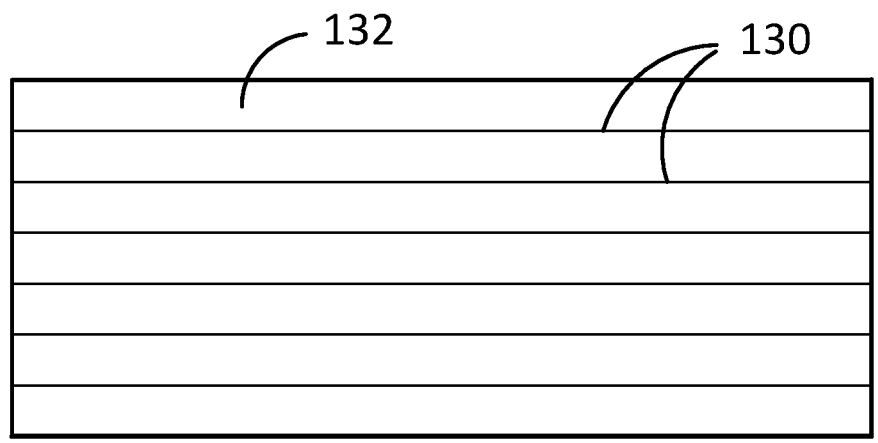
FIG. -3A-
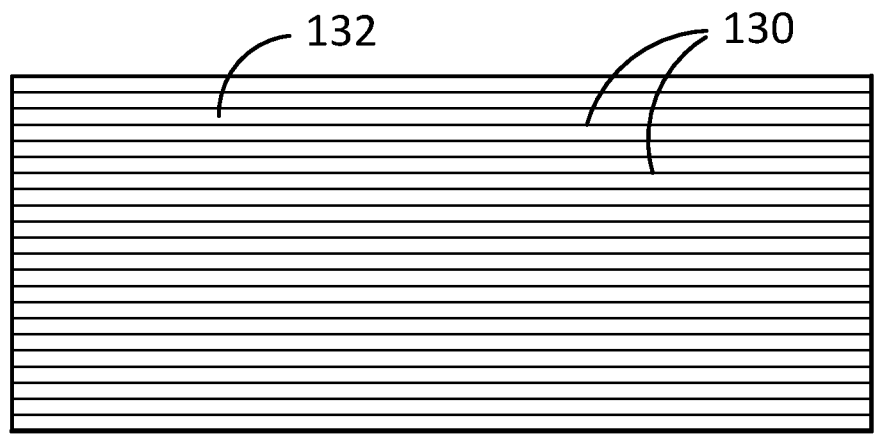
FIG. -3B-

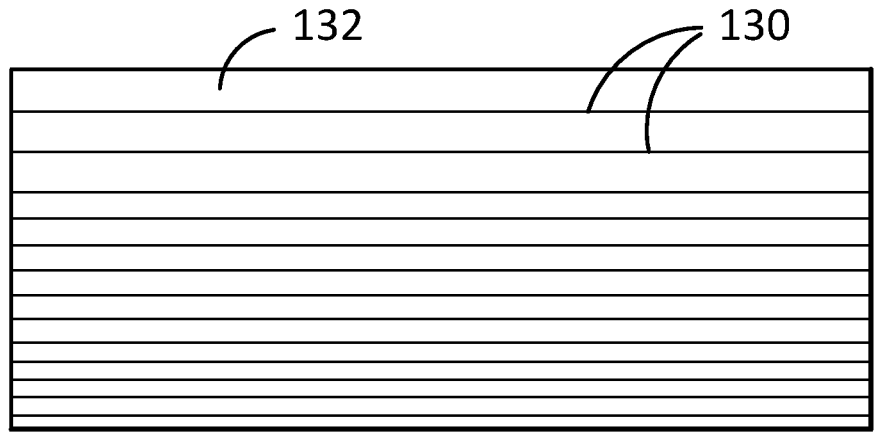
FIG. -3C-
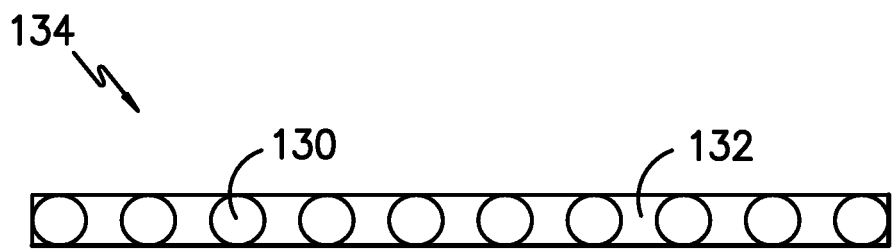
FIG. -4A-
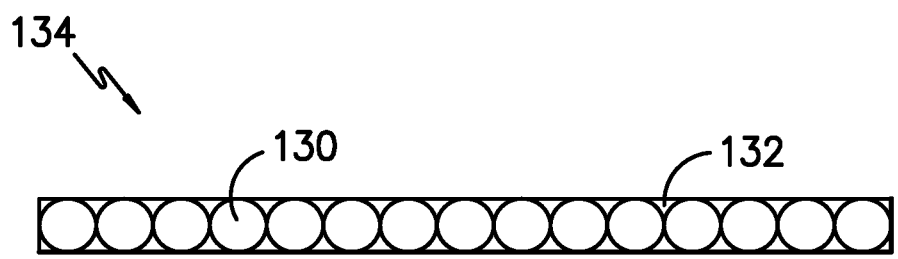
FIG. -4B-

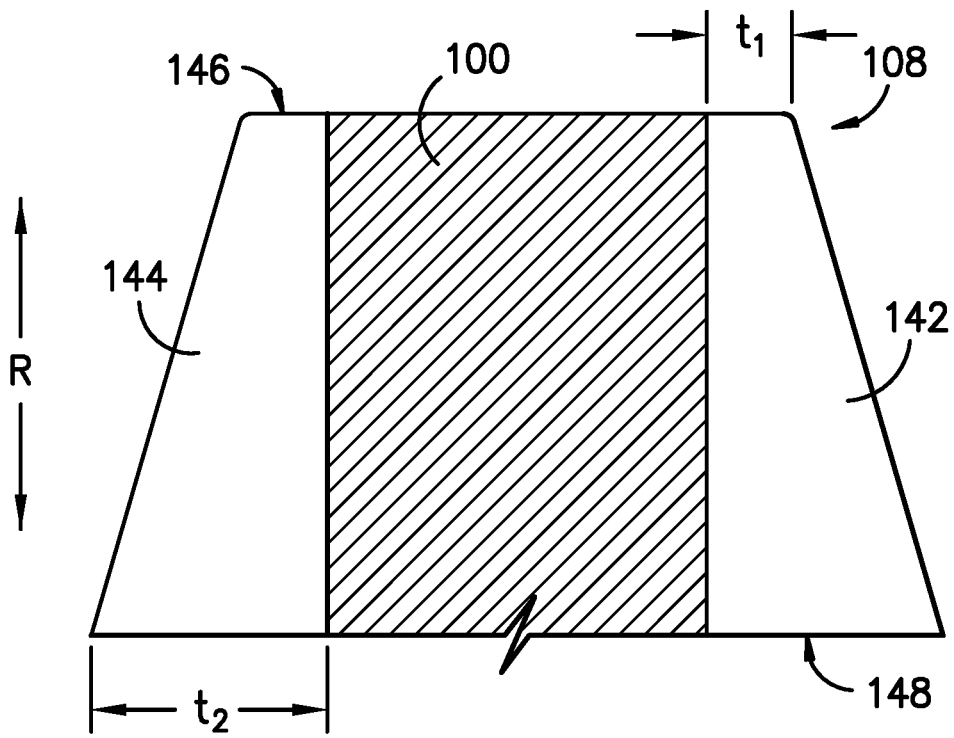
FIG. -5A-
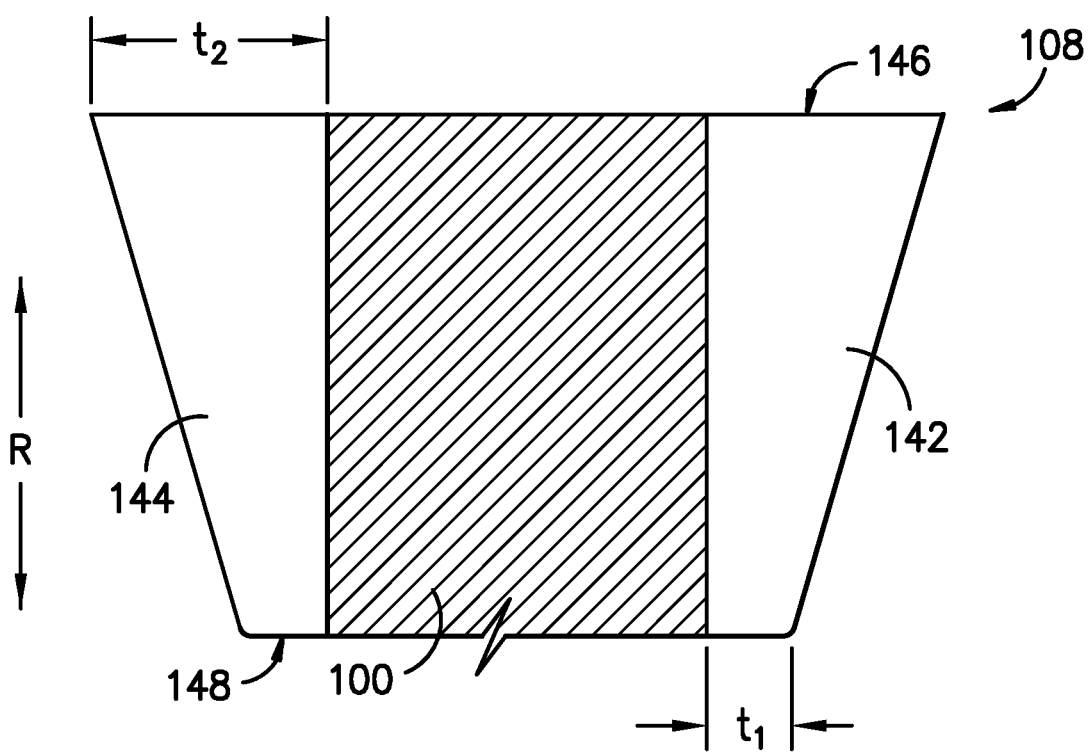
FIG. -5B-

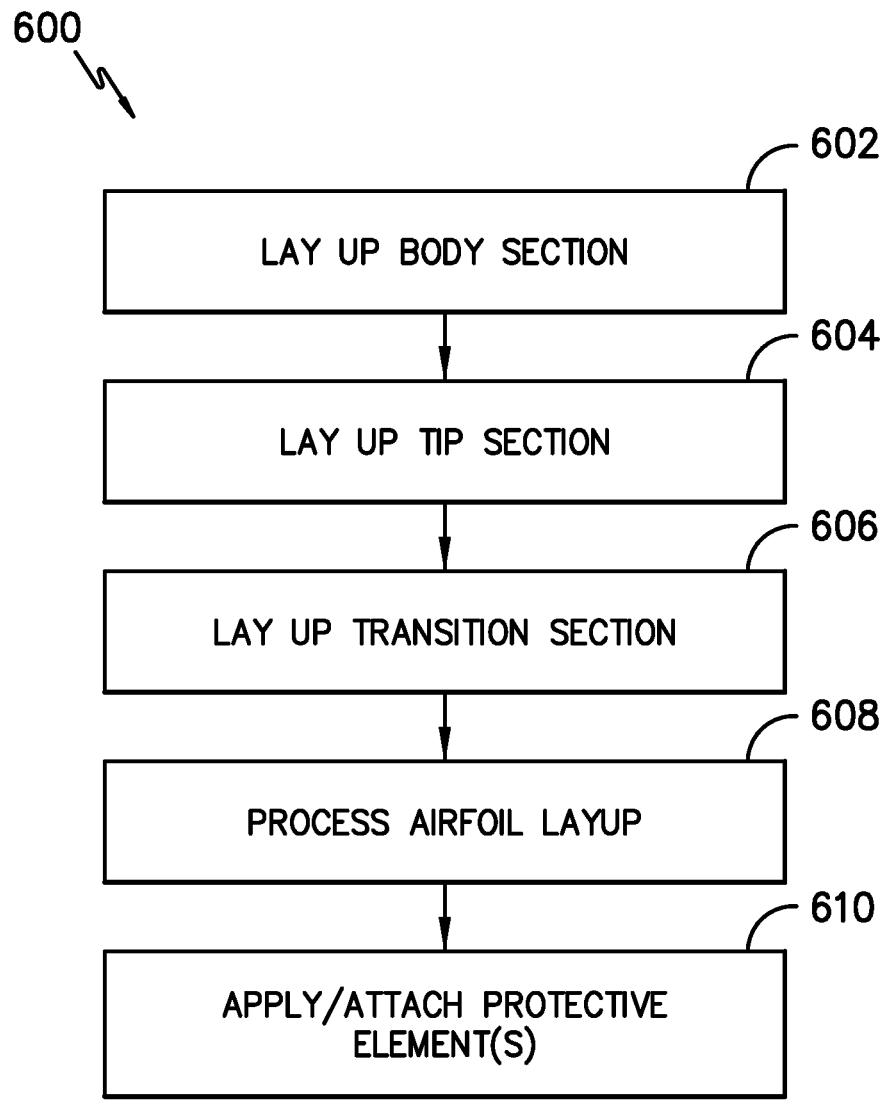
FIG. -6-

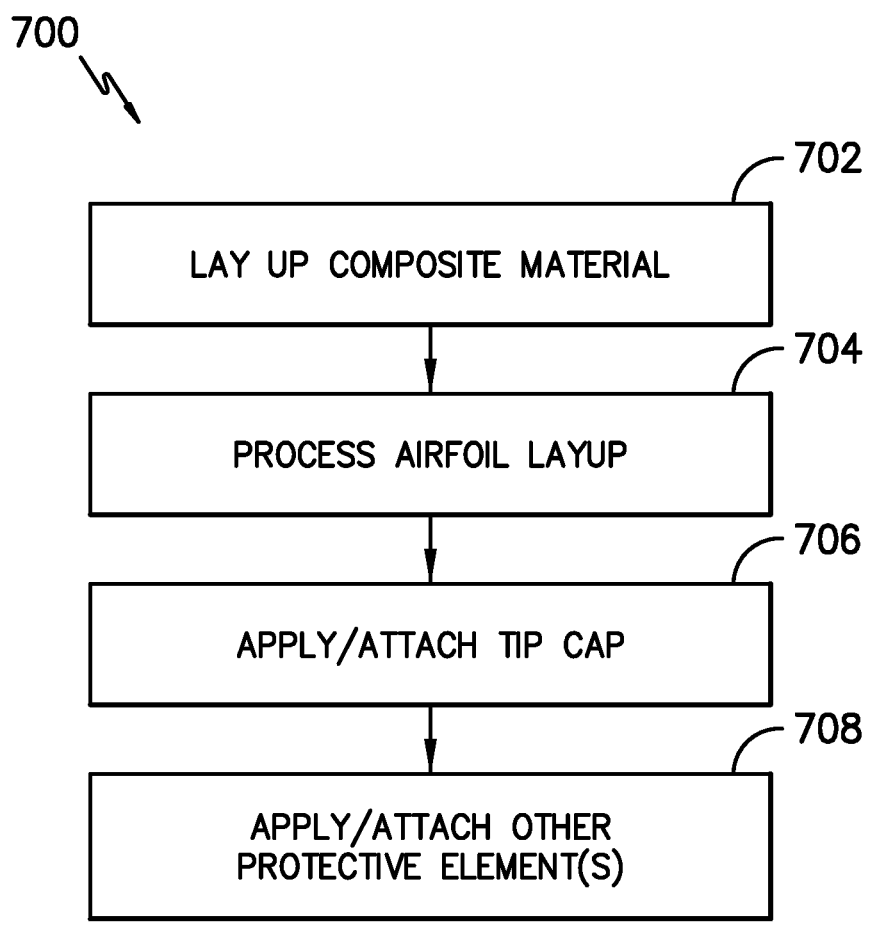
FIG. -7-

COMPOSITE AIRFOILS WITH FRANGIBLE TIPS

FIELD

The present subject matter relates generally to composite components. More particularly, the present subject matter relates to composite airfoils having frangible tips.

BACKGROUND

Aircraft gas turbine engines operate in various conditions and fan blade tips may rub against the fan casing under certain loading conditions. For instance, cross winds, bird impacts, or fan blade out (FBO) events can cause blade rub. Typically, the fan casing is designed to accommodate blade rub, e.g., through a section of abradable material, a trench filler, or the like in the fan casing to mitigate the effects of blade rub from composite fan blades. However, reinforcing the fan casing and/or the fan blades can add weight and complexity to the fan module, which can increase the cost of the fan module and impact engine performance, without avoiding rotor unbalance, e.g., during an FBO event. Similar disadvantages, e.g., with respect to tip rub and known casing modifications to mitigate the effects of tip rub, also may be realized with respect to other airfoils within aircraft gas turbine engines, as well as other gas turbine engines. Accordingly, improved composite airfoils for a gas turbine engine having features for mitigating airfoil tip rub would be desirable.

BRIEF DESCRIPTION

Aspects and advantages of the invention will be set forth in part in the following description, or may be obvious from the description, or may be learned through practice of the invention.

In one exemplary embodiment of the present subject matter, a composite airfoil of a gas turbine engine is provided. The composite airfoil comprises opposite pressure and suction sides extending radially along a span from a root to a tip. The root defines a first radial extremity of the airfoil, and the tip defines a second radial extremity of the airfoil. The composite airfoil further comprises a body section extending radially along the span and a tip section extending radially along the span. The tip section includes the tip. The composite airfoil is formed from a composite material comprising fibers disposed in a matrix material. The composite material in the body section has a body fiber volume, and the composite material in the tip section has a tip fiber volume. The body fiber volume is greater than the tip fiber volume.

In another exemplary embodiment of the present subject matter, an airfoil of a gas turbine engine is provided. The airfoil comprises a composite airfoil having opposite pressure and suction sides extending radially along a span from a root to an opposite tip. The root defines a first radial extremity of the airfoil, and the tip defines a second radial extremity of the airfoil. The airfoil also comprises a tip cap applied over the tip. The tip cap comprises a pressure side wall and a suction side wall. The tip cap tapers from a first end to a second end such that each of the pressure side wall and the suction side wall narrows from a first thickness at the first end to a second thickness at the second end. The composite airfoil is formed from a composite material comprising fibers disposed in a matrix material.

In a further exemplary embodiment of the present subject matter, a method for forming a composite airfoil of a gas turbine engine is provided. The method comprises laying up a body section of the composite airfoil. Laying up the body section comprises laying up layers of a composite material, each layer of the composite material comprising fibers disposed in a matrix material. The method further comprises laying up a tip section of the composite airfoil. Laying up the tip section comprises laying up layers of the composite material. Autoclaving the body section and the tip section to form the composite airfoil. The composite airfoil extends radially along a span from a root to a tip. The tip defines the radially distal extremity of the airfoil with respect to the root. A fiber volume of the body section is greater than a fiber volume of the tip section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a side perspective view of a fan blade of the gas turbine engine of FIG. 1, the fan blade having a composite airfoil according to an exemplary embodiment of the present subject matter.

FIG. 3A provides a schematic cross-section view of a tip section of the composite airfoil of FIG. 2, according to an exemplary embodiment of the present subject matter.

FIG. 3B provides a schematic cross-section view of a body section of the composite airfoil of FIG. 2, according to an exemplary embodiment of the present subject matter.

FIG. 3C provides a schematic cross-section view of a transition section of the composite airfoil of FIG. 2, according to an exemplary embodiment of the present subject matter.

FIG. 4A provides a schematic cross-section view of a composite layer of the tip section of the composite airfoil of FIG. 2, according to an exemplary embodiment of the present subject matter.

FIG. 4B provides a schematic cross-section view of a composite layer of the body section of the composite airfoil of FIG. 2, according to an exemplary embodiment of the present subject matter.

FIGS. 5A and 5B provide schematic cross-section views of a tip of the composite airfoil of FIG. 2 taken along the lines 5A-5A and 5B-5B, respectively, according to exemplary embodiments of the present subject matter.

FIGS. 6 and 7 provide flow diagrams illustrating methods for forming a composite airfoil, according to exemplary embodiments of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter provides composite airfoils with frangible tips, such as composite airfoils having low fiber volume tip sections and/or composite airfoils having a tip cap with tapered thickness walls. More particularly, the present subject matter provides composite airfoils having a body section and a tip section. In one embodiment, a fiber content in the body section is greater than a fiber content in the tip section. Additionally or alternatively, the present subject matter provides a tip cap disposed over a tip of a composite airfoil, the tip cap having a first wall extending along a pressure side of the airfoil and a second wall extending along a suction side of the airfoil, where each of the first wall and the second wall have a tapered thickness. The thickness of each of the first wall and the second wall may taper toward the tip, such that the thickness of the first and second walls is smallest at the tip, or taper away from the tip, such that the thickness of the first and second walls is largest at the tip. In exemplary embodiments, composite fan blades have low fiber volume tip sections and/or tapered thickness tip caps that are configured to fail under certain loading conditions, e.g., to avoid rub between the fan blades and fan casing and/or to avoid fan unbalance during a fan blade out (FBO) event.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a polymer matrix composite (PMC) material or a ceramic matrix composite (CMC) material, which has high temperature capability. Composite materials generally comprise a fibrous reinforcement material embedded in matrix material, e.g., a polymer or ceramic matrix material. The reinforcement material serves as a load-bearing constituent of the composite material, while the matrix of a composite material serves to bind the fibers together and act as the medium by which an externally applied stress is transmitted and distributed to the fibers. As used herein, the term "composite" is understood to include, but is not limited to, a PMC, a CMC, and a hybrid composite, e.g., a PMC in combination with metal or combinations of more than one PMC or combinations of more than one metal.

PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, nonlimiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins. Thus, generally, PMC materials include matrices that are thermoset or thermoplastic and reinforcements that include, but are not limited to, glass, graphite, aramid, or organic fiber of any length, size, or orientation or combination of these reinforcements, and are further understood to include, but are not limited to, being manufactured by injection molding, resin transfer molding, prepreg tape layup (hand or automated), pultrusion, or any other suitable method for manufacture of a reinforced polymer matrix composite structure or combination of these manufacturing methods.

Exemplary CMC materials may include silicon carbide (SiC), silicon, silica, carbon, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., 3M's Nextel 440 and 480), and chopped whiskers and fibers (e.g., 3M's Nextel 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Turning to FIG. 2, a composite component of a gas turbine engine, such as engine 10, will be described according to an exemplary embodiment of the present subject matter. As illustrated in the exemplary embodiment of FIG. 2, the composite component may be a composite airfoil 100 of a fan blade 40, but in other embodiments, the composite component may be another composite airfoil, such as an inlet guide vane (IGV) or an outlet guide vane (OGV) 52, or other composite component. The fan blade 40 shown in FIG. 2 includes the composite airfoil 100 having a concave pressure side 102 opposite a convex suction side 104. Opposite pressure and suction sides 102, 104 of the airfoil 100 extend radially along a span S from a root 106 to a tip 108 at the radially outermost portion of the fan blade 40. That is, the root 106 defines a first radial extremity of the airfoil 100, and the tip 108 defines a second radial extremity of the airfoil 100.

Moreover, pressure and suction sides 102, 104 of the airfoil 100 extend axially between a leading edge 110 and an opposite trailing edge 112. The leading edge 110 defines a forward end of the airfoil 100, and the trailing edge 112 defines an aft end of the airfoil 100. Further, the pressure side 102 defines an outer pressure surface 114 of the airfoil 100, and the suction side 104 defines an outer suction surface 116 (FIGS. 5A, 5B) of the airfoil 100. Additionally, in the depicted embodiment, a leading edge segment 118 is applied over or attached to the leading edge 110, a trailing edge segment 120 is applied over or attached to the trailing edge 112, and a tip cap 122 is applied over or attached to the tip 108. A portion of each of the leading edge segment 118, the trailing edge segment 120, and the tip cap 122 contacts the outer pressure surface 114 and the outer suction surface 116. The leading edge segment 118, the trailing edge segment 120, and the tip cap 122 may each be formed from a metal, e.g., the segment 118 may be a metallic leading edge segment, the segment 120 may be a metallic trailing edge segment, and the cap 122 may be a metallic tip cap 122. However, other suitable materials for the leading and trailing edge segments 118, 120 and the tip cap 122 may be used as well.

Keeping with FIG. 2, the airfoil 100 has a body section 124 that extends radially along the span S, as well as a tip section 126 that extends radially along the span S and includes the tip 108 of the airfoil 100. In the exemplary embodiment of FIG. 2, the airfoil 100 also includes a transition section 128 disposed between the body section 124 and the tip section 126 such that the transition section 128 extends from the body section 124 to the tip section 126. In other embodiments, the transition section 128 may be omitted.

It will be appreciated that the composite airfoil 100 is formed from a composite material. More particularly, as illustrated in FIGS. 3A and 3B, the composite airfoil 100 may be formed from a composite material comprising fibers 130 disposed in a matrix material 132. The composite material in the body section 124 has a body fiber volume, i.e., the fibers of the composite material forming the body section 124 together have a volume referred to herein as the body fiber volume. Similarly, the composite material in the tip section 126 has a tip fiber volume, i.e., the fibers of the composite material forming the tip section 126 together have a volume referred to herein as the tip fiber volume. The body fiber volume is greater than the tip fiber volume, as shown through a comparison of FIG. 3A, which illustrates a portion of the tip section 126, and FIG. 3B, which illustrates a portion of the body section 124. More specifically, the volume or density of fibers in the body section 124 is greater than the volume or density of fibers in the tip section 126. As such, the tip section 126 has a reduced fiber content relative to the body section 124, and the airfoil 100 may be described as having a low fiber volume tip.

The reduced fiber content of the tip section 126 facilitates breakup of the tip section 126, e.g., when the tip section 126 experiences a load over a tip fracture load. For instance, where the composite airfoil 100 is a composite fan blade 40 of the gas turbine engine fan 38, the threshold tip fracture load may be exceeded when the tip 108 rubs against the fan case 50 following large bird ingestion into the fan 38 and/or resulting from unbalance after a fan blade out (FBO) event. The frangible tip section 126 of the airfoil 100 allows the tip section 126 to disintegrate and thereby stop rubbing against the fan case 50. More particularly, the fibers 130 take loads in the radial direction R, and with a reduced amount of fiber to reinforce the composite material, the load carrying capability is reduced in the reduced fiber tip section 126 such that the composite material in the tip section 126 breaks up sooner than, or under a lighter load than, other portions of the airfoil 100. The disintegration of the tip section 126 may reduce or eliminate high rub conditions between the airfoil and another component and/or unbalance conditions. As such, the tip section 126 may be described as a fuse zone, which controls the portion of the airfoil 100 that may be lost or released by failing before the airfoil areas adjacent to the fuse zone, e.g., during impact from a foreign object. Unlike the tip section 126, the higher fiber content body section 124 may remain intact, which may, e.g., preserve a sufficient airfoil shape for continued operation of the engine 10 and/or help prevent rotor unbalance.

Further, the composite material in the transition section 128 has a transition fiber volume, i.e., the fibers of the composite material forming the transition section 128 together have a volume referred to herein as the transition fiber volume. The transition section 128, as a transition between the body section 124 and the tip section 126, has a reduced fiber volume compared to the body section 124 but a greater fiber volume compared to the tip section 126, as illustrated by a comparison between FIG. 3C, depicting a portion of the transition section 128, and FIGS. 3A (tip section 126) and 3B (body section 124). That is, the body fiber volume is greater than the transition fiber volume, and the transition fiber volume is greater than the tip fiber volume. In some embodiments, the fibers in the transition section 128 may be distributed such that the amount of fiber tapers from a first segment of the transition section 128 adjacent the body section 124 to a second segment adjacent the tip section 126. More particularly, the transition section 128 may have a graded fiber content, which is largest near the body section and diminishes along the radial direction R to a smallest transition section fiber content near the tip section 126. As previously described, in some embodiments, the transition section 128 may be omitted. In some such embodiments, the fiber content in each of the body section 124 and the tip section 126 may be graded such that the amount of fiber in the airfoil 100 tapers from a largest fiber content near the root 106 to a smallest fiber content near the tip 108.

A reduced fiber content may be achieved in different ways. For example, the composite material may comprise a plurality of prepreg layers or prepreg plies 134. Each prepreg layer 134 contains a plurality of fibers 130 disposed in the matrix material 132, and in various embodiments described herein, the composite material in the tip section 126 has a higher matrix material to fiber ratio than the composite material in the body section 124. In some embodiments, the fibers 130 in each layer 134 may extend substantially along the same direction such that the prepreg layers 134 may be referred to as a unidirectional prepreg. The prepreg layers 134 may be oriented within the composite airfoil 100 to form a unidirectional laminate, i.e., the fibers throughout the airfoil 100 extend substantially along the same direction. In other embodiments, the prepreg layers 134 may be oriented such that the fibers 130 extend in 0/+45/−45/+90 directions. More specifically, when laying up the prepreg layers 134, unidirectional prepreg layers 134 may be laid up such that the fibers 130 within the prepreg layers 134 alternate between a 0° orientation, a +45° orientation, a −45° orientation, and a +90° orientation with respect to a reference axis, such as an axial centerline of the fan case 50 where the composite component is the composite airfoil 100 of a fan blade 40. Other orientations of fibers 130 may be used as well, e.g., 0/90 directions with respect to the reference axis or other directions with respect to the reference axis. Further, the airfoil 100 may be formed with the fibers 130 having such orientations, e.g., to form a unidirectional laminate, along the 0/+45/−45/+90 directions, and along 0/90 directions, even where the composite material forming the airfoil 100 is not a composite prepreg material.

As shown in FIGS. 4A and 4B, in an exemplary embodiment the prepreg layers 134 forming the tip section 126 may have fewer fibers per layer than the prepreg layers 134 forming the body section 124. Accordingly, when the tip section prepreg layers 134 are stacked together to form the tip section 126 and the body section prepreg layers 134 are stacked together to form the body section 124, the tip section 126 has fewer fibers, or a lower tip fiber volume, than the body section 124. Similarly, the transition section 128 may be formed from prepreg layers 134 that have fewer fibers per layer than the prepreg layers 134 forming the body section 124 but more fibers per layer than the prepreg layers 134 forming the tip section 126.

As another example, additional matrix material 132 may be disposed between adjacent layers forming the tip section 126, which decreases the fiber content as a percentage of the total material content of the tip section 126. For embodiments including a transition section 128, additional matrix material 132 also may be disposed between layers forming the transition section 128 to reduce the fiber content of the transition section 128 compared to the body section 124, with more matrix material 132 disposed between the tip section layers 134 to further reduce the fiber content. More particularly, in some embodiments, the same prepreg layers 134 may be used to form the body section 124 and the tip section 126, as well as the transition section 128. However, matrix material 132 may be inserted between prepreg layers 134 of the tip section 126, while only prepreg layers 134 are used to form the body section 124. For instance, the composite material may be a polymer matrix composite (PMC), and the matrix material 132 may be a resin. A first volume of the resin matrix material 132 may be disposed between the prepreg layers 134 forming the tip section 126, thereby decreasing the fiber content of the tip section 126 compared to the body section 124 without the matrix material 132 between its layers 134. For example, prepreg layers 134 may be alternated with layers of resin matrix material 132 to form the tip section 126; in some embodiments, the layers of resin 132 may be injected or otherwise inserted between adjacent prepreg layers 134 such that pockets of resin are disposed among the composite prepreg layers 134. In embodiments including the transition section 128, a second volume of the resin matrix material 132 may be inserted between prepreg layers 134 of the transition section 128 to decrease the fiber content of the transition section 128 relative to the body section 124 but maintain a higher fiber content relative to the tip section 126. Like the first volume of resin 132, the second volume of resin 132 may be alternated with composite prepreg layers 134 to form the transition section 128. It will be appreciated that the first volume of the resin matrix material 132 may be greater than the second volume of the resin matrix material 132 where the total volume of the tip section 126 and the transition section 128 are equal. Otherwise, the first volume and the second volume may be appropriate to ensure the fiber content as a percentage of total volume is less in the tip section 126 than in the transition section 128.

As shown in FIG. 2, the tip section 126 may run chordwise, or along the chord length of the airfoil 100, or in other embodiments, the tip section 126 may run along any portion of the chord length of the airfoil 100. Further, the tip section 126 may be distributed along the radial length or span S of the airfoil 100 or any portion of the span S of the airfoil 100. Exemplary radial locations for the tip section 126, as measured radially distal from the root 106, may include, but are not limited to, from about 50% of the span S to 100% of the span S (i.e., from about mid-span to the tip 108); from about 60% of the span S to 100% of the span S; from about 75% of the span S to 100% of the span S; from about 80% of the span S to 100% of the span S; and from about 85% of the span S to 100% of the span S. Exemplary radial locations for the transition section 128, as measured radially distal from the root 106, may include, but are not limited to, from about 40% of the span S to the tip section 126; from about 50% of the span S to the tip section 126; from about 60% of the span S to the tip section 126; and from about 75% of the span S to the tip section 126.

As previously described, a leading edge segment 118 may be applied over the leading edge 110, including over at least a portion of the leading edge 110 in the tip section 126. The leading edge segment 118 may comprise a first breakaway feature 136 such that the leading edge segment 118 is configured to fracture under the tip fracture load. Similarly, a trailing edge segment 120 may be applied over the trailing edge 112 along at least a portion of the trailing edge 112 in the tip section 126. The trailing edge segment 120 may comprise a second breakaway feature 138 such that the trailing edge segment 120 is configured to fracture under the tip fracture load. Further, a tip cap 122 may be applied over the entirety of or a portion of the tip 108. The tip cap 122 may comprise a third breakaway feature 140 such that the tip cap 122 is configured to fracture under the tip fracture load. Accordingly, each of the leading edge segment 118, the trailing edge segment 120, and the tip cap 122 may be configured to breakup or disintegrate under loads at or above the tip fracture load such that the leading edge segment 118, the trailing edge segment 120, and/or the tip cap 122 do not hinder the breakup or disintegration of the tip section 126. That is, even though the leading edge segment 118, the trailing edge segment 120, and the tip cap 122 may be formed from a different material than the tip section 126 (e.g., metallic segments 118, 120 and metallic cap 122 may be applied over the composite tip section 126), the segments 118, 120 and cap 122 may be frangible like the tip section 126, at least along the portion of the respective segment 118, 120 and the cap 122 extending over the tip section 126.

In some embodiments, the breakaway features 136, 138, 140 may be slots, notches, or the like, or combinations thereof, that are defined along the respective segment or cap 118, 120, 122. For instance, in an exemplary embodiment, the first breakaway feature 136 is a plurality of slots defined along the leading edge segment 118. In the same exemplary embodiment, or a different exemplary embodiment, the second breakaway feature 138 is a plurality of notches defined along the trailing edge segment 120. In exemplary embodiments, the third breakaway feature 140 is a plurality of slots and a plurality of notches defined along the tip cap 122. In embodiments in which a combination of features is used (e.g., a combination of slots and notches), the individual features may be grouped together, alternated with one another, or distributed along the segment or cap 118, 120, 122 in any other appropriate manner.

Turning now to FIGS. 5A and 5B, in exemplary embodiments, a frangible tip section 126 also may be formed with a tapered thickness tip cap 122. More particularly, an exemplary tip cap 122 includes a pressure side wall 142 and a suction side wall 144. The pressure side wall 142 extends along the pressure side 102 of the composite airfoil 100 at its tip 108, and the suction side wall 144 extends along the suction side 104 of the composite airfoil 100 at its tip 108. The pressure side wall 142 and the suction side wall 144 each extend radially from a distal end 146 disposed at the tip 108 to a proximal end 148 that is spaced from the distal end 146 along the radial direction R toward the root 106 (i.e., the proximal end 148 is closer to the root 106 than the distal end 146).

As shown in FIGS. 5A and 5B, the tip cap 122 tapers from a first end to a second end such that each of the pressure side wall 142 and the suction side wall 144 narrows from a first thickness $t_1$ at the first end to a second thickness $t_2$ at the second end, i.e., the first thickness $t_1$ is greater or larger than the second thickness $t_2$ such that each wall 142, 144 is thicker at the first end than the second end. In some embodiments, such as illustrated in FIG. 5A, the first end is the proximal end 148 and the second end is the distal end 146 such that the tip cap 122 tapers from the proximal end 148 to the distal end 146 and is thicker at the proximal end 148 (closer to the root 106) than at the distal end 146 (at the tip 108). In other embodiments, such as illustrated in FIG. 5B, the first end is the distal end 146 and the second end is the proximal end 148 such that the tip cap 122 tapers from the distal end 146 to the proximal end 148 and is thicker at the distal end 146 (at the tip 108) than at the proximal end 148 (closer to the root 106).

It will be appreciated that the tapered thickness tip cap 122 may be used together with or separately from the low fiber content tip section 126. For example, in some embodiments, the third breakaway feature 140 is a tapered thickness tip cap 122, including a tapered thickness pressure side wall 142 and a tapered thickness suction side wall 144. In other embodiments, the tapered thickness tip cap 122 may be applied over an airfoil tip that does not have a reduced fiber content, e.g., the tapered thickness tip cap 122 may be applied to a composite airfoil having a substantially homogenous fiber content from the airfoil root to the airfoil tip. Further, whether or not used with a reduced fiber content tip section 126, in some embodiments the tapered thickness tip cap 122 also may include slots, notches, or the like, or combinations thereof, to facilitate breakup or disintegration of the tip cap 122 in the event a threshold load on the tip 108 is met or exceeded, e.g., during impingement by a foreign object, tip rub due to fan blade out, etc.

Referring now to FIG. 6, a flow diagram is provided illustrating an exemplary method 600 of forming a composite component of a gas turbine engine, such as a composite airfoil 100 having a frangible tip portion. As shown at 602 and 604 of FIG. 6, the method 600 includes laying up a body section 124 of the composite airfoil 100 and laying up a tip section 126 of the composite airfoil 100. In exemplary embodiments, laying up the body section 124 comprises laying up layers or plies of a composite material, each layer comprising reinforcing fibers 130 disposed in a matrix material 132. Further, in some embodiments, laying up the tip section 126 comprises alternating composite layers with layers of the matrix material 132, which lowers the fiber content (e.g., as a percentage of the total volume or as a ratio of fiber to matrix material) of the tip section 126 compared to the body section 124. In other embodiments, laying up the tip section 126 comprises laying up composite layers or plies that have a lower fiber content (e.g., fewer fibers) than the composite layers or plies laid up to form the body section 124. Additionally, the layers forming the tip section 126 (including the composite layers and the layers of matrix material 132 in embodiments including matrix material 132 inserted between composite layers forming the tip section 126) may be laid up on the body section 124 or the composite layers forming the body section 124 may be laid up on the tip section 126. It will be appreciated that the composite airfoil layup, including the body section 124 layup and the tip section 126 layup, may be supported on an appropriate tool.

As described herein, in some embodiments, the reinforcing fibers 130 may be formed into a unidirectional tape impregnated with the matrix material 132 and the matrix-impregnated tape may be cut into pieces that are referred to as composite prepreg layers or plies 134. Thus, the composite layers laid up to form the body section 124 and/or tip section 126 may be composite prepreg layers 134. In one exemplary embodiment, the composite prepreg layers 134, e.g., in the tip section 126, may be laid up such that the prepreg layers 134 are oriented in the 0/+45/−45/+90 directions (with respect to a reference direction, such as the centerline axis of the fan case 50 where the composite component is a composite airfoil 100 of a fan blade 40).

Moreover, as described herein, for PMC materials, the reinforcing fibers 130 may be carbon, glass, aromatic polyamide, and/or metal fibers, and the matrix material 132 may be a resin such as a thermoplastic or thermoset resin. Of course, such fibers 130 and matrix materials 132 are provided only as non-limiting examples of fibers 130 and matrices 132 that may be used to form the composite airfoil 100. Other suitable fibers 130 and/or matrices 132 may be used as well.

As shown at 606 in FIG. 6, in some embodiments, the method 60 further includes laying up a transition section 128 of the composite airfoil 100, but in other embodiments, the transition section 128 is omitted. As described herein, laying up the transition section 128 may comprise alternating composite layers with layers of the matrix material 132, which lowers the fiber content (e.g., as a percentage of the total volume or as a ratio of fiber to matrix material) of the transition section 128 compared to the body section 124. In such embodiments, even more matrix material 132 may be inserted between composite layers in the tip section 126 to lower the fiber content of the tip section 126 compared to the transition section 128. In other embodiments, laying up the transition section 128 comprises laying up composite layers or plies that have a lower fiber content (e.g., fewer fibers) than the composite layers or plies laid up to form the body section 124 but a higher fiber content (e.g., more fibers) than the composite layers or plies laid up to form the tip section 126. Moreover, the transition section 128 may be laid up on the body section 124 or the tip section 126, depending on the layup order (i.e., whether the body section 124 or tip section 126 is laid up first) for a particular airfoil layup, such that the transition section 128 is disposed between the body section 124 and the tip section 126.

Referring to 608 in FIG. 6, the method 600 also includes thermally and/or chemically processing the body section 124 layup and the tip section 126 layup, and in some embodiments, the transition section 128 layup, to form the composite airfoil 100. For example, processing the airfoil layup may include autoclaving the body section 124 and the tip section 126 to form the composite airfoil 100. That is, the composite airfoil layup may be debulked and consolidated, e.g., at elevated temperatures and pressures in an autoclave, to adhere or laminate the plurality of layers together, including laminating the layers of the body section 124 to the layers of the tip section 126. In some embodiments, the composite airfoil may undergo further processing, e.g., densification and finishing processes, following the autoclave process. For a CMC airfoil 100, the composite airfoil layup may be debulked and, if appropriate, cured while subjected to elevated pressures and temperatures to produce a cured preform, e.g., the layup or preform may be cured in an autoclave to form an autoclaved body. In exemplary embodiments, the autoclaved body is then heated (fired) in a vacuum or inert atmosphere to decompose the binders, remove the solvents, and convert the precursor to the desired ceramic matrix material. Due to decomposition of the binders, the result for the preform is a porous CMC fired body that may undergo densification, e.g., melt infiltration (MI), to fill the porosity and yield the respective CMC component. Specific processing techniques and parameters for the thermal and/or chemical processing of the airfoil layup, including the body section 124 and tip section 126, as well as the transition section 128 in some embodiments, will depend on the particular composition of the materials. As an example, other known methods or techniques for curing composite plies, as well as for densifying a CMC component, may be utilized.

Further, as shown at 610 in FIG. 6, the method 600 may comprise applying or attaching one or more protective elements, such as the leading edge segment 118, the trailing edge segment 120, and the tip cap 122, to the airfoil 100. That is, the leading-edge segment 118, the trailing edge segment 120, and the tip cap 122 may be disposed on the airfoil 100 either individually (i.e., without another segment or cap) or in any combination (e.g., both the leading edge and trailing edge segments 118, 120 without the tip cap 122 or all of the leading edge segment 118, trailing edge segment 120, and tip cap 122). As described herein, the leading edge segment 118 may incorporate a first breakaway feature along a portion of the leading segment 118 that overlies the tip section 126, and the trailing edge segment 120 may incorporate a second breakaway feature along a portion of the trailing edge segment 120 that overlies the tip section 126. Similarly, the tip cap 122 may incorporate a third breakaway feature. The first, second, and third breakaway features may be slots, notches, or the like that facilitate breakup of the respective segment 118, 120 or tip cap 122 when subjected to a load at or above the tip fracture load, such that the segments 118, 120 and tip cap 122 do not hinder the disintegration of the tip section 126 under certain loading conditions. Further, in some embodiments, the tip cap 122 may comprise tapered thickness walls 142, 144, which may facilitate breakup of the tip cap 122 when subjected to a load at or above the tip fracture load.

Turning now to FIG. 7, a flow diagram is provided illustrating an exemplary method 700 of forming a composite component of a gas turbine engine, such as a composite airfoil 100 having a frangible tip portion. As shown at 702 of FIG. 7, the method 700 includes laying up a composite material to form an airfoil layup. In exemplary embodiments, laying up the composite material comprises laying up layers or plies of a composite material, each layer comprising reinforcing fibers 130 disposed in a matrix material 132. As described herein, in some embodiments, the reinforcing fibers 130 may be formed into a unidirectional tape impregnated with the matrix material 132 and the matrix-impregnated tape may be cut into pieces that are referred to as composite prepreg layers or plies 134. Thus, the composite material laid up to form the airfoil preform may be composite prepreg layers 134. Moreover, where the composite material is a PMC material, the reinforcing fibers 130 may be carbon, glass, aromatic polyamide, and/or metal fibers, and the matrix material 132 may be a resin such as a thermoplastic or thermoset resin. Of course, such fibers 130 and matrix materials 132 are provided only as non-limiting examples of fibers 130 and matrices 132 that may be used to form the composite airfoil 100. Other suitable fibers 130 and/or matrices 132 may be used as well.

Referring to 704 in FIG. 7, the method 700 includes thermally and/or chemically processing the airfoil layup to form the composite airfoil 100. For example, processing the airfoil layup may include autoclaving the airfoil layup, i.e., the composite airfoil layup may be debulked and consolidated, e.g., at elevated temperatures and pressures in an autoclave. In some embodiments, the composite airfoil may undergo further processing, e.g., densification and finishing processes, following the autoclave process. As described herein, for a CMC airfoil 100, the composite airfoil layup may be debulked and, if appropriate, cured while subjected to elevated pressures and temperatures to produce a cured preform, e.g., the layup or preform may be cured in an autoclave to form an autoclaved body. In exemplary embodiments, the autoclaved body is then heated (fired) in a vacuum or inert atmosphere to decompose the binders, remove the solvents, and convert the precursor to the desired ceramic matrix material. Due to decomposition of the binders, the result for the preform is a porous CMC fired body that may undergo densification, e.g., melt infiltration (MI), to fill the porosity and yield the respective CMC component. Specific processing techniques and parameters for the thermal and/or chemical processing of the airfoil layup will depend on the particular composition of the materials. As an example, other known methods or techniques for curing composite plies, as well as for densifying a CMC component, may be utilized.

Further, as shown at 706 in FIG. 7, the method 700 may comprise applying or attaching a tapered thickness tip cap 122 to the composite airfoil 100. As described herein, the tapered thickness tip cap 122 includes a pressure side wall 142 and a suction side wall 144 that each are tapered from a first end to a second end. In some embodiments, the first end is a proximal end 148 of the tip cap 122 and the second end is a distal end 146 of the tip cap 122, such that the walls 142, 144 narrow from a first, larger thickness $t_1$ at the proximal end 148 (closer to the root 106) to a second, smaller thickness $t_2$ at the distal end 146 (disposed at the tip 108). In other embodiments, the first end is the distal end 146 and the second end is the proximal end 148, such that the walls 142, 144 narrow from a first, larger thickness $t_1$ at the distal end 146 (disposed at the tip 108) to a second, smaller thickness $t_2$ at the proximal end 148 (closer to the root 106). The tapered thickness tip cap 122 facilitates breakup of the tip cap 122 when subjected to a load at or above a tip fracture load described herein.

As illustrated at 708 in FIG. 7, the method 700 also may comprise applying or attaching another protective element, such as the leading edge segment 118 and/or the trailing edge segment 120, to the composite airfoil 100. That is, the leading-edge segment 118 and the trailing edge segment 120 may be disposed on the airfoil 100 with the tip cap 122 either individually (i.e., without the other segment 118, 120) or together (i.e., both the leading edge and trailing edge segments 118, 120). As described herein, the leading edge segment 118 may incorporate a first breakaway feature, e.g., near the airfoil tip 108, and the trailing edge segment 120 may incorporate a second breakaway feature, e.g., near the airfoil tip 108. Similarly, the tip cap 122 may incorporate a third breakaway feature. The first, second, and third breakaway features may be slots, notches, or the like that facilitate breakup of the respective segment 118, 120 or tip cap 122 when subjected to a load at or above the tip fracture load.

Accordingly, as described herein, the present subject matter provides composite airfoils, such as gas turbine engine fan blades, with reduced volume fiber content and/or a cap having tapered walls at a tip of the composite airfoil to create a frangible tip. The present subject matter also provides methods for forming frangible tip airfoils. Such frangible tip airfoils may help in reducing rub between a non-stationary airfoil and a stationary component. For example, rub between a fan blade and an abradable fan case and/or a fan blade and a trench filler may be reduced for fan blades having frangible tips. The frangible tip airfoils may have a balanced design, e.g., the frangible tip area may be configured to fail once a load on the tip area meets or exceeds a threshold value. For instance, a fan blade having a low fiber volume tip and/or a tapered thickness tip cap may be designed such that the tip does not fail in light rub conditions or events, e.g., cross wind or medium flocking bird impact, but does fail in higher rub conditions or events, e.g., fan blade out (FBO) or large bird ingestion. Thus, the present subject matter may reduce fan unbalance, e.g., in FBO, and thereby reduce loads under an FBO event. Moreover, by reducing rub between the airfoil and an adjacent component, current apparatus intended to mitigate the effects of airfoil rub can be reduced or eliminated. For example, fan blades having low fiber volume tips and/or tapered thickness tip caps as described herein may reduce or completely eliminate the thickness of the current trench-filler system on the fan casing of certain gas turbine engines. By reducing or eliminating apparatus such as the trench-filler system and/or other devices for minimizing the effects of airfoil or blade rub, the overall weight and cost of the airfoil module (e.g., the fan module) can be significantly reduced. Reducing the weight of the module can lead to performance benefits. Further, as described herein, airfoils having frangible tips may be achieved without compromising on the strength and durability of the airfoil, e.g., frangible tip fan blades formed as described herein may have comparable strength and durability of fan blades with non-frangible tips. Other advantages of the subject matter described herein also may be realized by those of ordinary skill in the art.

Further aspects of the invention are provided by the subject matter of the following clauses:

1. A composite airfoil of a gas turbine engine comprising opposite pressure and suction sides extending radially along a span from a root to a tip, the root defining a first radial extremity of the airfoil and the tip defining a second radial extremity of the airfoil; a body section extending radially along the span; and a tip section extending radially along the span, the tip section including the tip, wherein the composite airfoil is formed from a composite material comprising fibers disposed in a matrix material, the composite material in the body section having a body fiber volume and the composite material in the tip section having a tip fiber volume, and wherein the body fiber volume is greater than the tip fiber volume.

2. The composite airfoil of any preceding clause, further comprising a transition section disposed between the body section and the tip section such that the transition section extends from the body section to the tip section, the composite material in the transition section having a transition fiber volume, wherein the body fiber volume is greater than the transition fiber volume, and wherein the transition fiber volume is greater than the tip fiber volume.

3. The composite airfoil of any preceding clause, wherein the composite material comprises a plurality of prepreg layers, wherein the matrix material is a resin, wherein the tip section comprises a first volume of resin disposed between adjacent prepreg layers, wherein the transition section comprises a second volume of resin disposed between adjacent prepreg layers, and wherein the first volume is greater than the second volume.

4. The composite airfoil of any preceding clause, wherein the tip as measured radially distal from the root is defined at 100% of the span, wherein the transition section extends from about 50% of the span to the tip section, and wherein the tip section extends from about 80% of the span to 100% of the span.

5. The composite airfoil of any preceding clause, wherein the tip as measured radially distal from the root is defined at 100% of the span, and wherein the tip section extends from about 50% of the span to 100% of the span.

6. The composite airfoil of any preceding clause, wherein the composite material comprises a unidirectional fiber prepreg, and wherein the composite material in the tip section has a higher matrix material to fiber ratio than the composite material in the body section.

7. The composite airfoil of any preceding clause, wherein the composite material is a ceramic matrix composite.

8. The composite airfoil of any preceding clause, wherein the composite material comprises a plurality of prepreg layers, wherein the matrix material is a resin, and wherein the tip section comprises a volume of resin disposed between adjacent prepreg layers.

9. The composite airfoil of any preceding clause, further comprising opposite leading and trailing edges extending radially along the span, the pressure and suction sides extending axially between the leading and trailing edges; and a metallic leading edge segment applied over the leading edge along at least a portion of the leading edge in the tip section, wherein the leading edge segment comprises a first breakaway feature such that the leading edge segment is configured to fracture under the tip fracture load.

10. The composite airfoil of any preceding clause, wherein the first breakaway feature is a plurality of slots defined along the leading edge segment.

11. The composite airfoil of any preceding clause, further comprising opposite leading and trailing edges extending radially along the span, the pressure and suction sides extending axially between the leading and trailing edges; and a metallic trailing edge segment applied over the trailing edge along at least a portion of the trailing edge in the tip section, wherein the trailing edge segment comprises a second breakaway feature such that the trailing edge segment is configured to fracture under the tip fracture load.

12. The composite airfoil of any preceding clause, wherein the second breakaway feature is a plurality of notches defined along the trailing edge segment.

13. The composite airfoil of any preceding clause, further comprising a metallic tip cap applied over the tip, wherein the tip cap comprises a third breakaway feature such that the tip cap is configured to fracture under the tip fracture load.

14. The composite airfoil of any preceding clause, wherein the third breakaway feature is a tapered thickness pressure side wall and a tapered thickness suction side wall, the pressure side wall of the tip cap extending along the pressure side of the composite airfoil at the tip, the suction side wall of the tip cap extending along the suction side of the composite airfoil at the tip.

15. The composite airfoil of any preceding clause, wherein the composite airfoil is a composite fan blade.

16. An airfoil of a gas turbine engine comprising a composite airfoil comprising opposite pressure and suction sides extending radially along a span from a root to an opposite tip, the root defining a first radial extremity of the airfoil and the tip defining a second radial extremity of the airfoil; and a tip cap applied over the tip, the tip cap comprising a pressure side wall and a suction side wall, the tip cap tapering from a first end to a second end such that each of the pressure side wall and the suction side wall narrows from a first thickness at the first end to a second thickness at the second end, wherein the composite airfoil is formed from a composite material comprising fibers disposed in a matrix material.

17. The composite airfoil of any preceding clause, wherein the second end is disposed at the tip such that the first end is closer to the root than the second end.

18. The composite airfoil of any preceding clause, wherein the first end is disposed at the tip such that the second end is closer to the root than the first end.

19. The composite airfoil of any preceding clause, further comprising a body section extending radially along the span; and a tip section extending radially along the span, the tip section including the tip, wherein the composite material in the body section has a body fiber volume and the composite material in the tip section has a tip fiber volume, and wherein the body fiber volume is greater than the tip fiber volume.

20. A method for forming a composite airfoil of a gas turbine engine, the method comprising laying up a body section of the composite airfoil, wherein laying up the body section comprises laying up layers of a composite material, each layer of the composite material comprising fibers disposed in a matrix material; laying up a tip section of the composite airfoil, wherein laying up the tip section comprises laying up layers of the composite material; and autoclaving the body section and the tip section to form the composite airfoil, wherein the composite airfoil extends radially along a span from a root to a tip, the tip defining the radially distal extremity of the airfoil with respect to the root, and wherein a fiber volume of the body section is greater than a fiber volume of the tip section.

21. A method for forming a composite airfoil of a gas turbine engine, the method comprising laying up a body section of the composite airfoil, wherein laying up the body section comprises laying up layers of a composite material, each layer of the composite material comprising fibers disposed in a matrix material; laying up a tip section of the composite airfoil, wherein laying up the tip section comprises laying up layers of the composite material; and processing the body section and the tip section to form the composite airfoil, wherein the composite airfoil extends radially along a span from a root to a tip, the tip defining the radially distal extremity of the airfoil with respect to the root, and wherein a fiber volume of the body section is greater than a fiber volume of the tip section.

22. The method of any preceding clause, wherein processing the body section and the tip section comprises autoclaving the body section and the tip section.

23. The method of any preceding clause, wherein autoclaving the body section and the tip section comprises debulking and consolidating the layers of the composite material forming the body section and the tip section at elevated temperatures and pressures in an autoclave.

24. The method of any preceding clause, wherein processing the composite airfoil comprises firing and densifying the composite airfoil after autoclaving the body section and the tip section.

25. The method of any preceding clause, further comprising applying or attaching a tapered thickness tip cap to the composite airfoil.

26. The method of any preceding clause, wherein the tapered thickness tip cap includes a pressure side wall and a suction side wall that each are tapered from a first end to a second end.

27. The method of any preceding clause, wherein the first end is a proximal end of the tip cap and the second end is a distal end of the tip cap such that the pressure side wall and the suction side wall each narrow from a first, larger thickness at the proximal end to a second, smaller thickness at the distal end.

28. The method of any preceding clause, wherein the first end is the distal end and the second end is the proximal end such that the pressure side wall and the suction side wall each narrow from a first, larger thickness at the distal end to a second, smaller thickness at the proximal end.

29. The method of any preceding clause, further comprising applying or attaching a protective element to the composite airfoil.

30. The method of any preceding clause, wherein the protective element is a leading edge segment disposed on a leading edge of the composite airfoil.

31. The method of any preceding clause, wherein the protective element is a trailing edge segment disposed on a trailing edge of the composite airfoil.

32. The method of any preceding clause, wherein the protective element incorporates a breakaway feature near the tip of the composite airfoil.

33. The method of any preceding clause, wherein the breakaway feature is a plurality of slots.

34. The method of any preceding clause, wherein the breakaway feature is a plurality of notches.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A composite airfoil of a gas turbine engine, comprising:
   opposite pressure and suction sides extending radially along a span from a root to a tip, the root defining a first radial extremity of the airfoil and the tip defining a second radial extremity of the airfoil;
   a body section extending radially along the span;
   a tip section extending radially along the span, the tip section including the tip; and
   a metallic tip cap extending to a trailing edge of the tip and applied over the tip,
   wherein the composite airfoil is formed from a composite material comprising fibers disposed in a matrix material, the composite material in the body section having a body fiber volume and the composite material in the tip section having a tip fiber volume, and
   wherein the body fiber volume is greater than the tip fiber volume such that the tip section and the metallic tip cap are configured to fracture under a tip fracture load,
   wherein the metallic tip cap comprises a first breakaway feature such that the metallic tip cap is configured to fracture under the tip fracture load, and
   wherein the first breakaway feature is a tapered thickness pressure side wall and a tapered thickness suction side wall, the pressure side wall of the metallic tip cap extending along the pressure side of the composite airfoil at the tip, the suction side wall of the metallic tip cap extending along the suction side of the composite airfoil at the tip.

2. The composite airfoil of claim 1, further comprising:
a transition section disposed between the body section and the tip section such that the transition section extends from the body section to the tip section, the composite material in the transition section having a transition fiber volume,
wherein the body fiber volume is greater than the transition fiber volume, and
wherein the transition fiber volume is greater than the tip fiber volume.

3. The composite airfoil of claim 2, wherein the composite material comprises a plurality of prepreg layers, wherein the matrix material is a resin, wherein the tip section comprises a first volume of resin disposed between adjacent prepreg layers, wherein the transition section comprises a second volume of resin disposed between adjacent prepreg layers, and wherein the first volume is greater than the second volume.

4. The composite airfoil of claim 2, wherein the tip as measured radially distal from the root is defined at 100% of the span, wherein the transition section extends from about 50% of the span to the tip section, and wherein the tip section extends from about 80% of the span to 100% of the span.

5. The composite airfoil of claim 1, wherein the tip as measured radially distal from the root is defined at 100% of the span, and wherein the tip section extends from about 50% of the span to 100% of the span.

6. The composite airfoil of claim 1, wherein the composite material comprises a unidirectional fiber prepreg, and wherein the composite material in the tip section has a higher matrix material to fiber ratio than the composite material in the body section.

7. The composite airfoil of claim 6, wherein the composite material is a ceramic matrix composite.

8. The composite airfoil of claim 1, wherein the composite material comprises a plurality of prepreg layers, wherein the matrix material is a resin, and wherein the tip section comprises a volume of resin disposed between adjacent prepreg layers.

9. The composite airfoil of claim 1, further comprising:
opposite leading and trailing edges extending radially along the span, the pressure and suction sides extending axially between the leading and trailing edges; and
a metallic leading edge segment applied over the leading edge along at least a portion of the leading edge in the tip section,
wherein the leading edge segment comprises a second breakaway feature such that the leading edge segment is configured to fracture under the tip fracture load.

10. The composite airfoil of claim 9, wherein the second breakaway feature is a plurality of slots defined along and disposed within the leading edge segment.

11. The composite airfoil of claim 1, further comprising:
opposite leading and trailing edges extending radially along the span, the pressure and suction sides extending axially between the leading and trailing edges; and
a metallic trailing edge segment applied over the trailing edge along at least a portion of the trailing edge in the tip section,
wherein the metallic trailing edge segment comprises a second breakaway feature such that the metallic trailing edge segment is configured to fracture under the tip fracture load.

12. The composite airfoil of claim 11, wherein the second breakaway feature is a plurality of notches defined along and disposed within the metallic trailing edge segment.

13. The composite airfoil of claim 1, wherein the composite airfoil is a composite fan blade.

14. An airfoil of a gas turbine engine, comprising:
a composite airfoil comprising opposite pressure and suction sides extending radially along a span from a root to an opposite tip, the root defining a first radial extremity of the airfoil and the tip defining a second radial extremity of the airfoil; and
a metallic tip cap applied over the tip at a trailing edge of the airfoil, the metallic tip cap comprising a pressure side wall and a suction side wall, the metallic tip cap positioned on the airfoil entirely away from a leading edge of the airfoil,
wherein the metallic tip cap tapers radially from a first end to a second end such that each of the pressure side wall and the suction side wall narrows from a first thickness at the first end to a second thickness at the second end,
wherein the composite airfoil is formed from a composite material comprising fibers disposed in a matrix material;
wherein the metallic tip cap comprises a first breakaway feature such that the metallic tip cap is configured to fracture under a tip fracture load, and
wherein the first breakaway feature is a tapered thickness pressure side wall and a tapered thickness suction side wall, the pressure side wall of the metallic tip cap extending along the pressure side of the composite airfoil at the tip, the suction side wall of the metallic tip cap extending along the suction side of the composite airfoil at the tip.

15. The composite airfoil of claim 14, wherein the second end is disposed at the tip such that the first end is closer to the root than the second end.

16. The composite airfoil of claim 14, wherein the first end is disposed at the tip such that the second end is closer to the root than the first end.

17. The composite airfoil of claim 14, further comprising:
a body section extending radially along the span; and
a tip section extending radially along the span, the tip section including the tip,
wherein the composite material in the body section has a body fiber volume and the composite material in the tip section has a tip fiber volume, and
wherein the body fiber volume is greater than the tip fiber volume.

18. A method for forming a composite airfoil of a gas turbine engine, the method comprising:
laying up a body section of the composite airfoil, wherein laying up the body section comprises laying up layers of a composite material, each layer of the composite material comprising fibers disposed in a matrix material;
laying up a tip section of the composite airfoil, wherein laying up the tip section comprises laying up layers of the composite material;
autoclaving the body section and the tip section to form the composite airfoil; and
attaching a metallic tip cap to a trailing edge of the tip, wherein the composite airfoil extends radially along a span from a root to a tip, the tip defining the radially distal extremity of the airfoil with respect to the root, and wherein a fiber volume of the body section is greater than a fiber volume of the tip section such that the tip section and the metallic tip cap are configured to fracture under a tip fracture load, and wherein the metallic tip cap comprises a breakaway feature that is a tapered thickness pressure side wall and a tapered thickness suction side wall, the pressure side wall of the metallic tip cap extending along the pressure side of the composite airfoil at the tip, the suction side wall of the metallic tip cap extending along the suction side of the composite airfoil at the tip.

* * * * *